(12) United States Patent
Lin

(10) Patent No.: US 7,261,422 B2
(45) Date of Patent: Aug. 28, 2007

(54) DISPLAY PROJECTION APPARATUS

(75) Inventor: Ming-Kuen Lin, Taisi Township, Yunlin County (TW)

(73) Assignee: Benq Corporation, Taoyuan Shien (TW)

( * ) Notice: Subject to any disclaimer, the term of this patent is extended or adjusted under 35 U.S.C. 154(b) by 226 days.

(21) Appl. No.: 11/029,622

(22) Filed: Jan. 6, 2005

(65) Prior Publication Data

US 2006/0146292 A1 Jul. 6, 2006

(51) Int. Cl.
*G03B 21/00* (2006.01)
*G03B 21/28* (2006.01)

(52) U.S. Cl. .............................. 353/33; 353/81; 353/99
(58) Field of Classification Search ................. 353/30, 353/31, 33, 34, 37, 81, 82, 99
See application file for complete search history.

(56) References Cited

U.S. PATENT DOCUMENTS

| 5,467,146 | A * | 11/1995 | Huang et al. ............... 348/743 |
| 6,343,864 | B1 * | 2/2002 | Tajiri ............................ 353/20 |
| 6,505,939 | B1 * | 1/2003 | Bierhuizen et al. ........... 353/94 |
| 6,705,734 | B1 * | 3/2004 | Barazza ........................ 353/98 |
| 7,101,049 | B2 * | 9/2006 | Shindoh ....................... 353/81 |
| 2002/0176054 | A1 * | 11/2002 | Mihalakis ..................... 353/31 |
| 2004/0141160 | A1 * | 7/2004 | Yoneyama .................... 353/98 |
| 2004/0246442 | A1 * | 12/2004 | Lee et al. ..................... 353/30 |
| 2006/0187416 | A1 * | 8/2006 | Ouchi et al. .................. 353/31 |

* cited by examiner

*Primary Examiner*—Rodney Fuller
(74) *Attorney, Agent, or Firm*—Rabin & Berdo, P.C.

(57) ABSTRACT

A projection display apparatus, including an illumination system, a light integrator, a first mirror module, a second mirror module, a beam condensing module, a total internal reflection (TIR) prism, a light modulator, and a set of projection lenses. The illumination system generates an optical beam propagating along a first beam path in a first direction. The first and second mirror module folds the optical beam, which is imaged onto the light modulator. The modulator selectively reflects the optical beam so as to propagate along a fourth beam path in a fourth direction, where the first beam path and the fourth beam path are substantially perpendicular with respect to each other. The invention provides a compact projection system for easy carriage.

9 Claims, 4 Drawing Sheets

DISPLAY PROJECTION APPARATUS

BACKGROUND OF THE INVENTION

1. Field of the Invention

The invention relates in general to image projection, and more particularly to a projection display apparatus

2. Description of the Related Art

Projection systems are widely used in various applications. A conventional projection system includes a light source, a digital micro-mirror device (DMD), such as one developed by Texas Instruments, and a set of projection lenses. The light source produces a light beam, which is imaged onto the DMD through a set of relay optics. The DMD modulates the light beam and in turn images the modulated light beam, through the projection lenses, onto a display screen to display an image. A color wheel is often used in addition to spatially filter the light beam from the lamp into respective red, green and blue components.

Due to the increase in business travel, there has been an upsurge in demand for compact projection systems for use in conducting presentations. Accordingly, there is a need to provide a compact projection system to address such demands.

SUMMARY OF THE INVENTION

It is therefore an object of the invention to provide a projection display apparatus, for addressing the aforementioned demands for compact system packaging.

The invention achieves the above-identified object by providing a projection display apparatus. The apparatus includes an illumination system, a light integrator, a first mirror module, a second mirror module, a beam condensing module, a total internal reflection (TIR) prism, a light modulator, and a set of projection lenses. The illumination system generates an optical beam propagating along a first beam path in a first direction. The light integrator, disposed on the first beam path, is for homogenizing the optical beam. The first mirror module is for directing the optical beam from the light integrator to a second direction, such that the optical beam propagates along a second beam path. The second mirror module is for directing the optical beam from the first mirror module to a third direction, such that the optical beam propagates along a third beam path. The beam condensing module includes at least a condenser, which is disposed on at least one of the first beam path, the second beam path, and the third beam path, for converging the optical beam. The total internal reflection (TIR) prism includes a prism surface and is for receiving the optical beam from the second mirror module. The light modulator includes a panel, and receives the optical beam from the prism surface to illuminate the panel thereof, and selectively reflects the optical beam, such that the reflected optical beam propagates along a fourth beam path in a fourth direction. The projection lenses are for receiving and projecting the optical beam, which is reflected from the light modulator, onto a display screen to display an image. Conditionally, the first beam path and the fourth beam path are substantially perpendicular with respect to each other.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
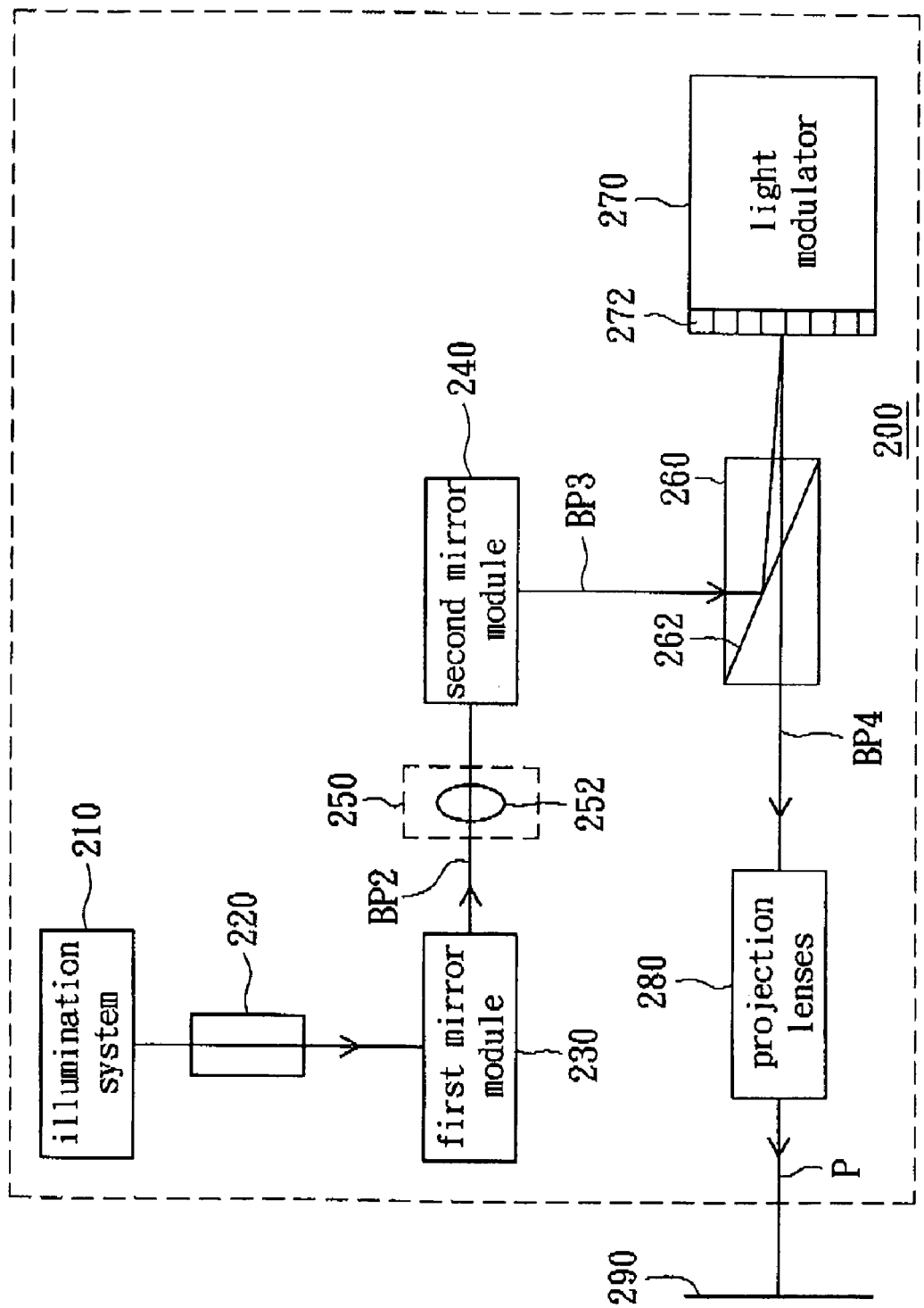
FIG. 1 shows a block diagram of a projection display apparatus according to a preferred embodiment of the invention.

FIG. 1 shows a block diagram of a projection display apparatus according to a preferred embodiment of the invention. The projection display apparatus 200 includes an illumination system 210, a light integrator 220, a first mirror module 230, a second mirror module 240, a beam condensing module 250, a TIR prism 260, a light modulator 270, including a panel 272, and a set of projection lenses 280. The illumination system 210 generates an optical beam to propagate along a first optical beam path BP1 in a first direction. The light integrator 220 is disposed on the first optical beam path BP1, and homogenizes the optical beam. After passing through the light integrator 220, the homogenized optical beam reaches the first mirror module mirror 230, and is directed towards a second direction such that the optical beam propagates along a second optical beam path BP2. The beam condensing module 250 includes at least a condenser which is disposed on at least one of the first optical beam path BP1, the second optical beam path BP2, and a third optical beam path BP3, and converges and focuses the optical beam. In FIG. 1, it is taken for an example that one condenser of the beam condensing module 250 is disposed on the second optical beam path PB2 and focuses the optical beam from the first mirror module 230 onto the second mirror module 240. The second mirror module 240 directs the optical beam from the first mirror module 230 to a third direction, such that the optical beam propagates along the third optical beam path BP3. The light modulator 270 receives the optical beam from the second fold mirror 240 via the prism surface 262 of TIR prism 260 to illuminate the panel 272 of the light modulator 270. The light modulator 270 selectively reflects the optical beam, such that the reflected beam propagates along a fourth optical beam path BP4 in a fourth direction. The projection lenses 280 receive the optical beam, which is reflected from the light modulator 270, and projects the received optical beam, 270. The light modulator 270 selectively reflects the optical beam, such that the reflected beam propagates along a fourth optical beam path BP4 in a fourth direction. The projection lenses 280 receive the optical beam, which is reflected from the light modulator 270, and projects the received optical beam, traveling a path P, onto the display screen 290 to display an image. The first optical beam path BP1 and the fourth optical beam path BP4 are substantially perpendicular with respect to each other.

Figure 2:
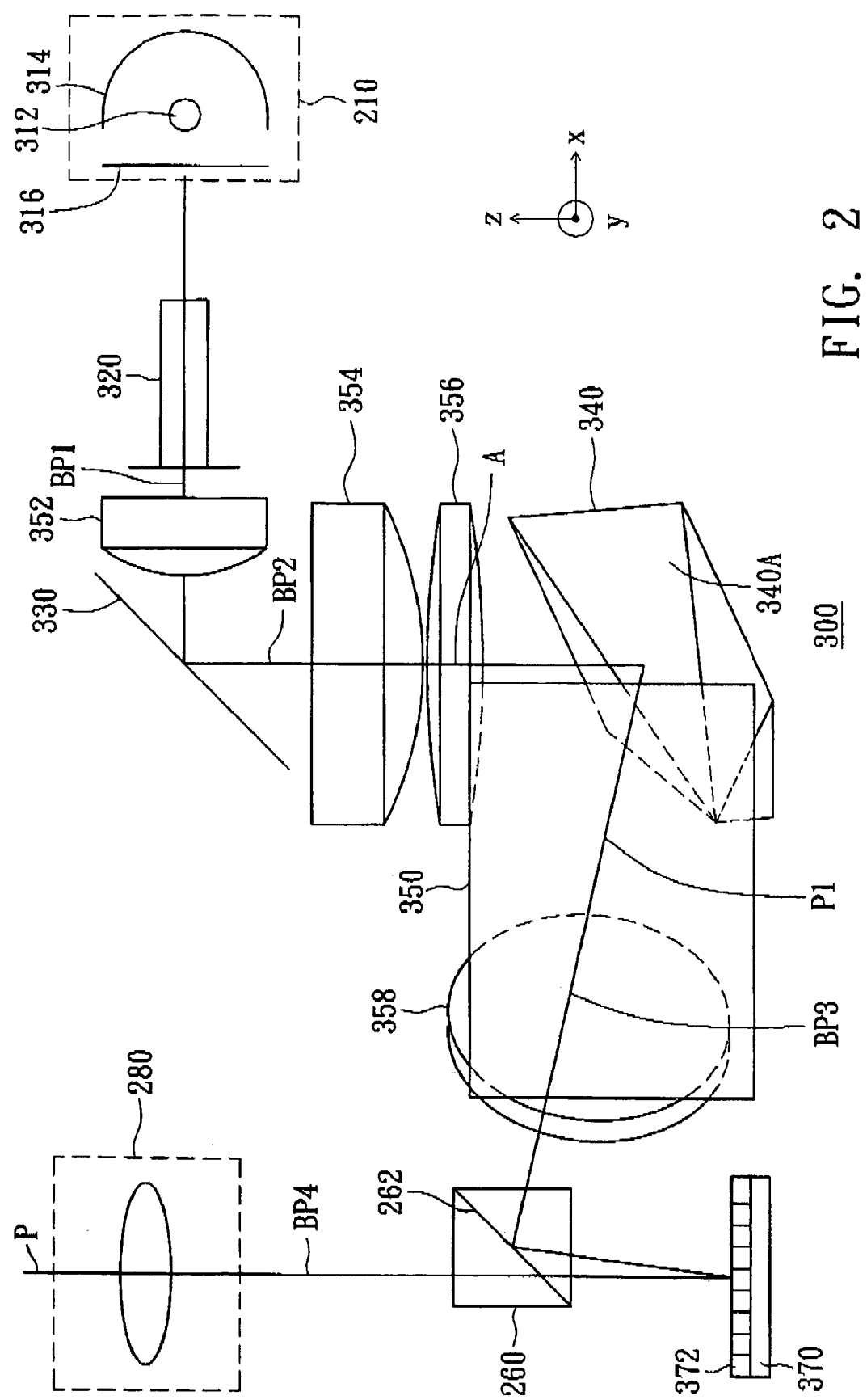
FIG. 2 shows a top view of one example of the projection display apparatus of FIG. 1 on an X-Z plane.
Figure 3:
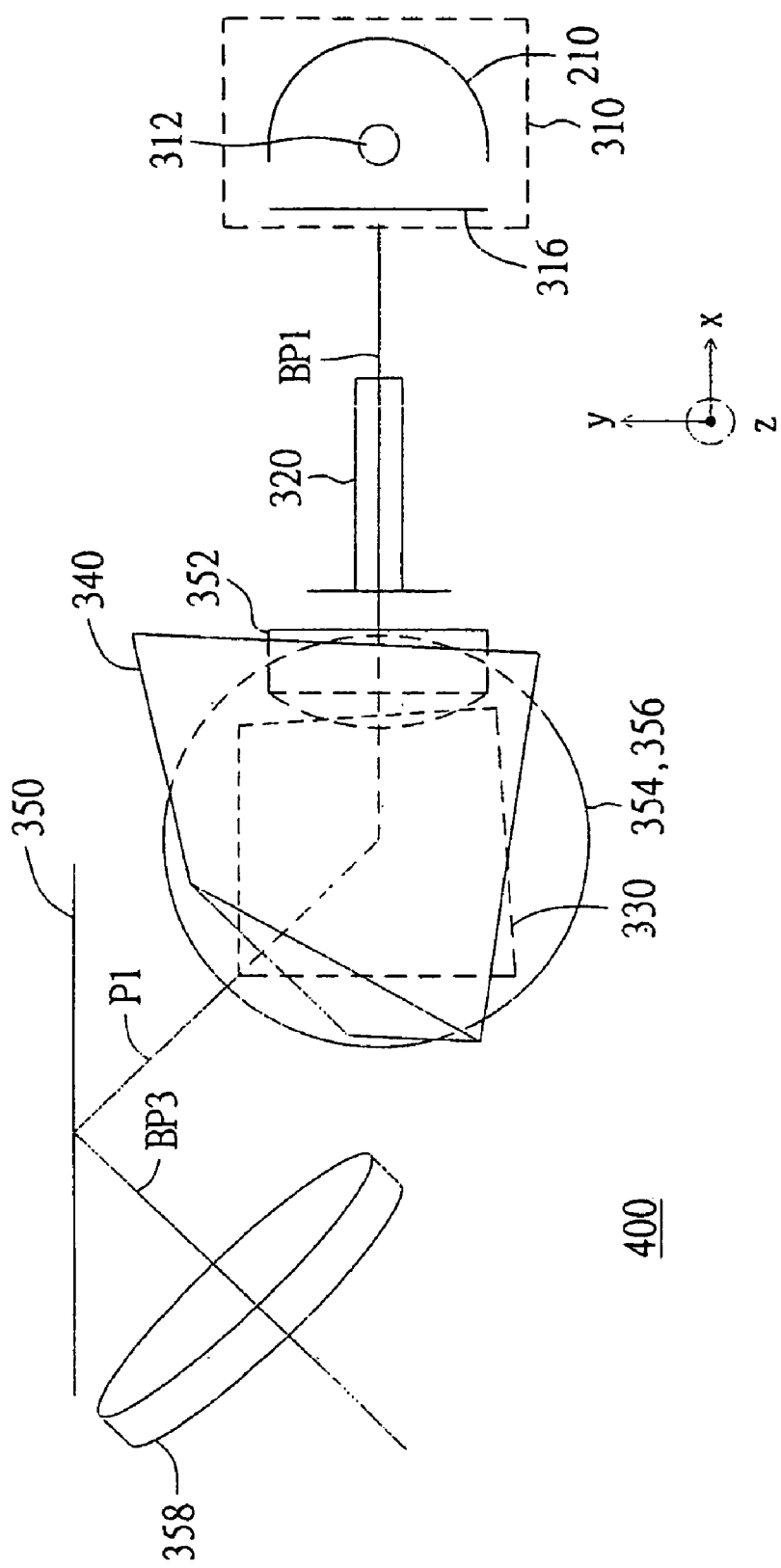
FIG. 3 shows a side view of the projection display apparatus 300 of FIG. 2 in on a X-Y plane.

FIG. 2 shows a top view of one example of the projection display apparatus of FIG. 1 on an X-Z plane, and FIG. 3 shows a side view of the projection display apparatus 300 of FIG. 2 in an X-Y plane. The light integrator 220 is a light tunnel 320. The first mirror module 230 includes a first reflective surface, such as a first fold mirror 330. The second mirror module 240 includes a second reflective surface, being a surface 340A of a second fold mirror 340, and a third reflective surface, being a reflective surface of a third fold mirror 350. The light modulator 270 is a DMD 370 that includes a panel 372. The illumination system 310 includes a lamp that constitutes of a first light source 312 and a housing 314 with reflecting coating, and a color wheel 316. The lamp, such as an arc lamp, generates an optical beam to propagate along the first optical beam path BP1 in the first direction. The color wheel 316 filters the optical beam into primary color components of red, green and blue. The light tunnel 320 converts a circular distribution of the optical beam at the entrance into a rectangular distribution at the exit, and simultaneously makes the light intensity distribution more uniform across the optical beam by creating a multiple of virtual images of lamps.

In this example, the beam condensing module 250 contains a plurality of condensers 352, 354, 356 and 358 for converging the optical beam. The condenser 352 of the beam condensing module is disposed on the first optical beam path BP1 for converging the optical beam output from the light tunnel 320. The condensers 354 and 356 are disposed on the second optical beam path BP2, and are for converging and focusing the optical beam into the second fold mirror 340. The second fold mirror 340 is for directing the optical beam from condensers 354 and 356 to the third fold mirror 350. The optical beam propagates along beam path P1 until hitting the third fold mirror 350, which guides the optical beam towards another direction to propagate along a third optical beam path BP3 and into the condenser 358. The condenser 358 focuses the optical beam to fit the active area of the panel 372 of the DMD 370 via the total reflection on the prism surface 262. Thus, the DMD 370, receiving the optical beam from the second fold mirror 340 via the third fold mirror 350, the condenser 358, and the prism surface 262, is to have the panel 372 illuminated by the received optical beam. The DMD 370 selectively reflects the optical beam, such that the reflected beam propagates along a fourth optical beam path BP4 in a fourth direction. The projection lenses 280 receives the optical beam, which reflects from the DMD 370 and passes through the prism surface 362, and projects the received optical beam, propagating along a beam path P, onto a display screen (not shown) to display the image.

As shown in the FIG. 3 and FIG. 2, the optical beam travels in the first direction passing through the condenser 352 to the first fold mirror 330, and is directed towards the second direction (Z direction). Preferably, the first direction and the second direction are perpendicular with respect to each other. The condenser 356 has an axis A passing (in line with the second optical beam path BP2) passing through the center of the condenser 356. The third fold mirror 350 is substantially perpendicular to the first fold mirror 330 and parallel to the axis A of the condenser 356, i.e., the third fold mirror 350 is approximately parallel to X-Z plane. Therefore, the second reflective surface 340A is capable of directing the optical beam of the second direction (along Z direction) to propagate toward the third reflective surface of the third fold mirror 350 along the beam path P1 (the beam path P1 approximately has an included angle 45 degree with the third fold mirror 350), and the third reflective surface of the third fold mirror 350 is for directing the optical beam to the third direction (the third optical beam path BP3 approximately has an included angle 45 degree with the third fold mirror 350).

Figure 4:
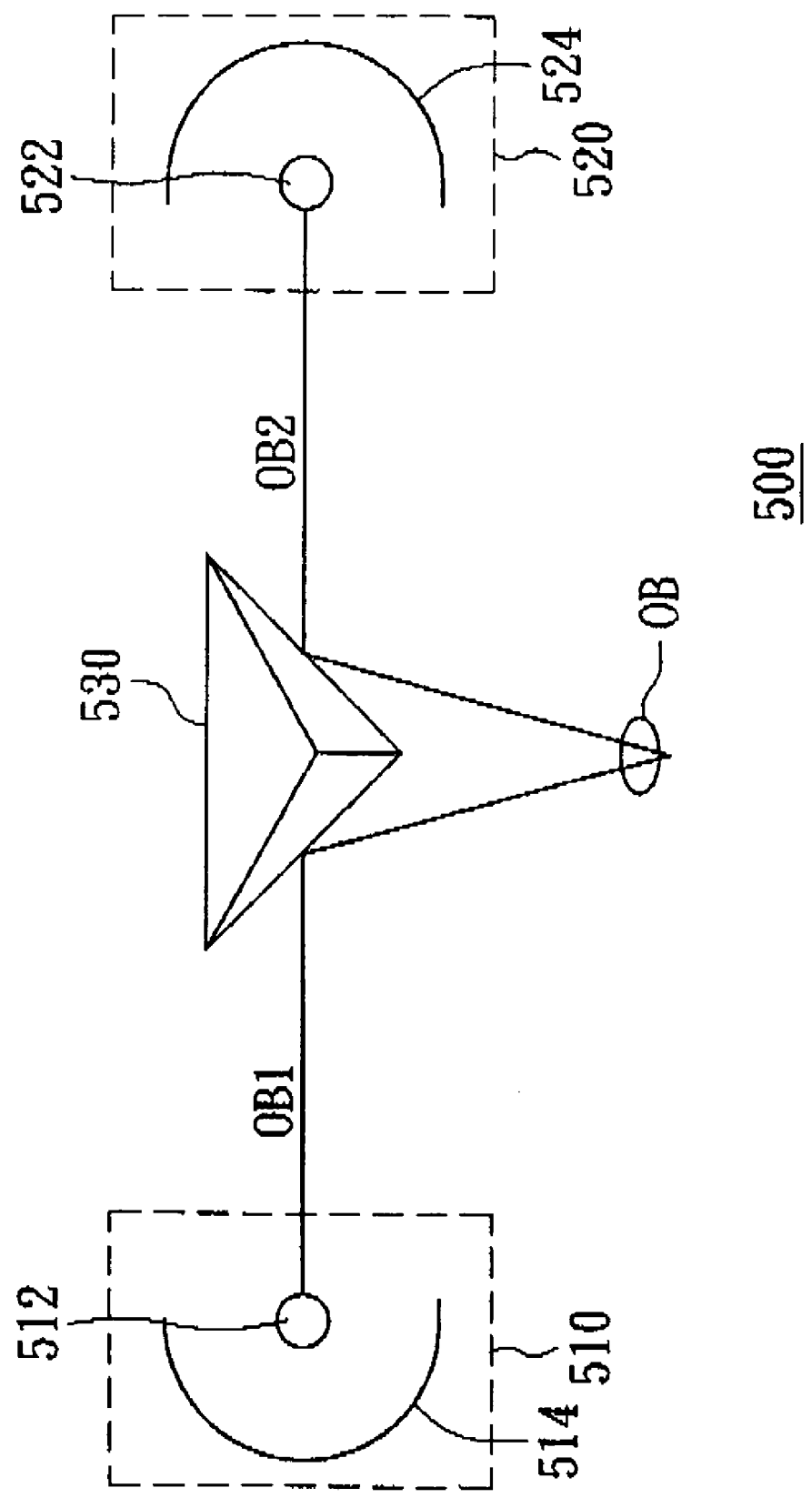
FIG. 4 shows a projection display apparatus according to a embodiment of the invention realized with a dual lamp system.

The illumination system can also be realized with dual lamps, as shown in FIG. 4. The illumination system 500 includes a first lamp 510, a second lamp 520, and a beam-combining unit, such as a prism 530. The first lamp 510 has a first light source 512 and a first housing 514 with reflective coating, the second lamp 520 has a second light source 522 and a second housing 524 with reflective coating. The optical beams OB1 and OB2 generated by the first light source 512 and the second light source 522, respectively, are reflected by the prism 530, and combine to generate the optical beam OB, which propagates along the first beam path in the first direction.

Additionally, the light tunnel 320 can be hollow or solid. The condensers 352, 354, 356, and 358 can be spherical or aspheric, and the mirror module, such as fold mirrors 330, 340, and 350, can be flat or curve.

Because the first optical beam path BP1 is designed to be substantially perpendicular to the fourth optical beam path BP4, the illumination system 210, the light integrator 220, the first mirror module 230 are aligned in a line which is almost perpendicular to the fourth optical beam path BP4. The disposition of the illumination system 210, the light integrator 220 allows the packaging size of the projection display apparatus to remain compact, especially in the case of employing dual lamps in the illumination system as shown in FIG. 4. By employing the display projection apparatus according to the embodiments of the present invention, the overall system package can be approximately square-shaped looking from the top side, X-Z plane, thus allowing the display projection apparatus to have a smaller overall dimension, and providing easier carriage by a user during travel.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A projection display apparatus, comprising:
    an illumination system for generating an optical beam propagating along a first optical beam path in a first direction;
    a light integrator, disposed on the first optical beam path, for homogenizing the optical beam;
    a first mirror module having a first fold mirror, for directing the optical beam from the light integrator to a second direction, such that the optical beam propagates along a second optical beam path, the first optical beam path and the second beam path defining an X-Z plane;
    a second mirror module, for directing the optical beam from the first mirror module to a third direction, such that the optical beam propagates along a third optical beam path, the second mirror module including a second fold mirror and a third fold mirror, the second fold mirror directing the optical beam from the second beam path to propagate toward the third fold mirror in a direction P1, the third fold mirror disposed at a distance from the X-Z plane for directing the optical beam to the third direction, wherein the direction P1 is away from the X-Z plane, and the third optical beam path is toward to the X-Z plane;
    a beam condensing module, comprising at least a condenser which is disposed on at least one of the first optical beam path, the second optical beam path, and the third optical beam path, for converging the optical beam;

a total internal reflection (TIR) prism, comprising a prism surface for receiving the optical beam from the second mirror module;

a light modulator, comprising a panel, for receiving the optical beam from the prism surface to illuminate the panel of the light modulator, and for selectively reflecting the optical beam, such that the reflected optical beam propagates along a fourth optical beam path in a fourth direction; and a set of projection lenses, for receiving and projecting the optical beam, which is reflected from the light modulator, onto a display screen;

wherein the first optical beam path and the fourth optical beam path are substantially perpendicular with respect to each other.

2. The apparatus according to claim 1, wherein the illumination system comprises:

a first lamp, having a first light source and a first housing with reflective coating, for generating the optical beam; and a color wheel, for spatially filtering the optical beam into primary color components comprising red, green and blue.

3. The projection display apparatus of claim 1, wherein the beam condenser module comprises at least three condensers, including a first condenser disposed on the first optical beam path, a second condenser disposed on the second optical beam path, and a third condenser disposed on the third optical beam path.

4. The apparatus according to claim 1, wherein the illumination system comprises a first lamp, a second lamp, and a beam-combining unit, the first lamp has a first light source and a first housing with reflective coating, the second lamp has a second light source and a second housing with reflective coating, and optical beams generated by the first light source and the second light source are combined by the beam-combining unit to generate the optical beam which propagates along the first optical beam path in the first direction.

5. The apparatus according to claim 1, wherein the light modulator is a digital micro-mirror device (DMD).

6. The apparatus according to claim 1, wherein the light integrator is a rectangular light tunnel.

7. The apparatus according to claim 1, wherein the first fold mirror comprises a first reflective surface for directing the optical beam from the first direction to the second direction, and the first direction and the second direction are substantially perpendicular with respect to each other.

8. The apparatus according to claim 7, wherein the condenser is disposed on the second optical beam path, the condenser has an axis, the second fold mirror and the third fold mirror respectively comprises a second reflective surface and a third reflective surface, the third reflective surface is substantially perpendicular to the first reflective surface and parallel to the axis, the second reflective surface directs the optical beam of the second direction to propagate toward the third reflective surface, and the third reflective surface directs the optical beam to the third direction.

9. The apparatus according to claim 1, wherein the third fold mirror is disposed parallel to the X-Z plane, for directing the optical beam towards to the X-Z plane.

* * * * *